(12) United States Patent
Shaked et al.

(10) Patent No.: US 6,606,421 B1
(45) Date of Patent: Aug. 12, 2003

(54) GEOMETRIC DEFORMATION CORRECTION METHOD AND SYSTEM FOR DOT PATTERN IMAGES

(75) Inventors: Doron Shaked, Haifa (IL); Avraham Levy, Kiryat-Tivon (IL); Izhak Baharav, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/578,843

(22) Filed: May 25, 2000

(51) Int. Cl.[7] ................................................ G06K 9/40
(52) U.S. Cl. ................................................ 382/275
(58) Field of Search ................................ 382/112, 151, 382/203, 204, 206, 229, 287, 290, 308, 309, 275, 293; 348/95, 96; 358/3.11

(56) References Cited

U.S. PATENT DOCUMENTS

| | | | | |
|---|---|---|---|---|
| 5,249,242 A | * | 9/1993 | Hanson et al. | 382/269 |
| 5,469,267 A | * | 11/1995 | Wang | 358/3.21 |
| 5,477,244 A | * | 12/1995 | Shibata et al. | 347/19 |
| 5,541,743 A | * | 7/1996 | Shiomi et al. | 358/534 |
| 5,594,815 A | * | 1/1997 | Fast et al. | 382/254 |
| 5,694,224 A | * | 12/1997 | Tai | 358/3.01 |
| 6,128,414 A | * | 10/2000 | Liu | 382/266 |
| 6,282,326 B1 | * | 8/2001 | Lee et al. | 382/289 |
| 6,295,386 B1 | * | 9/2001 | Ryu | 382/294 |
| 6,297,889 B1 | * | 10/2001 | Loce et al. | 358/1.9 |
| 6,317,219 B1 | * | 11/2001 | Kim | 358/1.2 |

* cited by examiner

Primary Examiner—Andrew W. Johns
Assistant Examiner—Shervin Nakhjavan

(57) ABSTRACT

A method and system for correcting geometric deformations in an aligned image. A shape deformation correction unit is provided for receiving the aligned image and based thereon for generating a shape-corrected image. A space deformation correction unit is coupled to the shape deformation correction unit and receives the shape-corrected image. The space deformation correction unit uses the shape-corrected image to generate edges and interfaces, and further generates a corrected image based on the interfaces and the shape-corrected image.

21 Claims, 3 Drawing Sheets

GEOMETRIC DEFORMATION CORRECTION METHOD AND SYSTEM FOR DOT PATTERN IMAGES

FIELD OF THE INVENTION

The present invention relates generally to image processing and more specifically to a geometric deformation correction method and system for dot pattern images.

BACKGROUND OF THE INVENTION

Bar-codes are information carrying graphical patterns designed for easy and reliable automatic retrieval. The most common bar-codes are known as one-dimensional bar-codes. These graphical patterns vary in a single dimension (e.g. the horizontal dimension), and are constant in the other dimension (e.g., the vertical dimension). One-dimensional bar-codes are employed in low information content applications like product index registry (e.g. automatic price tagging and inventory management), or serial number registry (e.g. test-tube tagging in automated medical tests). Common examples of one-dimensional bar-codes are those bar-codes that are affixed or printed on the packages of items purchased at a supermarket or other store. These bar-codes typically can only encode limited information, such as the price of the item and the manufacturer. The items having the bar-codes are scanned at a checkout counter to facilitate the tallying up of a total receipt.

In order to convey more information on the same surface area, two-dimensional bar-codes were developed. Two-dimensional bar-codes involve intricate patterns that vary in both the horizontal and the vertical dimensions. Two-dimensional bar-codes are used in applications that require more information content. For example, two-dimensional bar-codes can be used to encode mail addresses for automated mail reading and distribution systems. Mail carrier companies can use the two-dimensional bar code on shipping packages to encode shipper information, recipient information, tracking information, etc. In another example, two-dimensional bar-codes can be used to encode the compressed content of a printed page to avoid the need for optical character recognition at the receiving end.

Two-dimensional bar-codes are typically graphical patterns composed of dots that are rendered by using two-toned dots (e.g. black dots on a white background). These dots usually occupy a rectangular area. Most current systems use a bar-code printer to print an original bar-code, and the bar-code readers detect that original bar-code. However, it is desirable in many office applications to have a bar-code system that can scan and reliably recover information from copies of the original bar-code. For example, if the original bar-code is embedded in an office document and is given to a first worker, and the first worker desires to share the document with a co-worker, it would be desirable for the first worker to copy the document and provide the same to the co-worker having confidence that the information embedded in a bar-code in the document could be recovered by the co-worker if needed.

Unfortunately, the prior art bar-code and bar-code reading systems cannot reliably recover information encoded in the bar-code except from an original bar-code that is newly printed by a bar-code printer. For example, most systems have difficulty in reliably reading and recovering information from a bar-code that is a photocopy of the original. Moreover, prior art systems have an even greater difficulty in accurately reading and recovering information from a bar-code that is a photocopy of another photocopy of the bar-code (e.g., a bar-code that has been photocopied two or more times).

Accordingly, a challenge in the design of 2D bar-codes and systems to read such bar-codes is to develop a scheme that can produce bar-codes and reliably recover information from bar-codes, even after successive copies of the original, using office equipment. In other words, the system needs to be designed in such a way as to compensate for degradation of the bar-code, thereby making such a system robust. In summary, it is desirable that a bar-code design and bar-code system be designed in such a way as to ensure that the bar-codes can be recognized and the encoded information recovered even after successive copying and handling in a paper path.

The bar-code pattern is often degraded between the time of creation and its use. These degradations can include contrast reduction, stains, marks, and deformations. Many degradations can be corrected by utilizing one or more traditional methods, such as contrast enhancement, adaptive thresholding, and error-correction coding. However, geometric pattern deformation remains a challenge and does not lend itself to resolution by prior art methods. Geometric pattern deformation can occur, for example, when a pattern is photocopied.

The photocopying process can inject the following types of geometric deformations to the dots in a bar-code pattern. The first type of geometric deformations is shape deformations. Shape deformations cause the dots to change their size either shrinking or expanding the dots. Shape deformations typically depend on the brightness setting of the copier. For example, when the brightness setting is set to a darker setting, the dots tend to expand. When the brightness setting is set to a lighter setting, the dots tend to shrink.

The second type of geometric deformations is space deformations. Space deformations cause the dots corresponding to certain coordinates in the original image to be located at different coordinates in the copy. There are two types of space deformations: global deformations and local deformations. Global shape deformations, such as translation, rotation or affine, are those that change the coordinates of the dots in a way that is consistent with an equation that describes the deformations for the entire image. There are also local space deformations that are deformations that cannot be modeled as a global space deformation. These local space deformations are especially difficult to characterize and correct.

Accordingly, there remains a need for a method for correcting geometric deformations in bar-code patterns that overcomes the disadvantages set forth previously.

SUMMARY OF THE INVENTION

It is an object of the present invention to provide a method for correcting geometric deformations in a bar-code pattern.

It is another object of the present invention to provide a method for correcting shape deformations in a bar-code pattern.

It is a further object of the present invention to provide a method for correcting space deformations in a bar-code pattern.

A method and system for correcting geometric deformations in an aligned image. A shape deformation correction unit is provided for receiving the aligned image and based thereon for generating a shape-corrected image. A space deformation correction unit is coupled to the shape deformation correction unit and receives the shape-corrected image. The space deformation correction unit uses the shape-corrected image to generate edges and interfaces, and further generates a corrected image based on the interfaces and the shape-corrected image.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. The following description and the drawings are illustrative of the invention and are not to be construed as limiting the invention.

As described previously, an image is typically rendered using two tones (e.g., black dots on a white background).

Bar-code Decoding System 10

Figure 1:
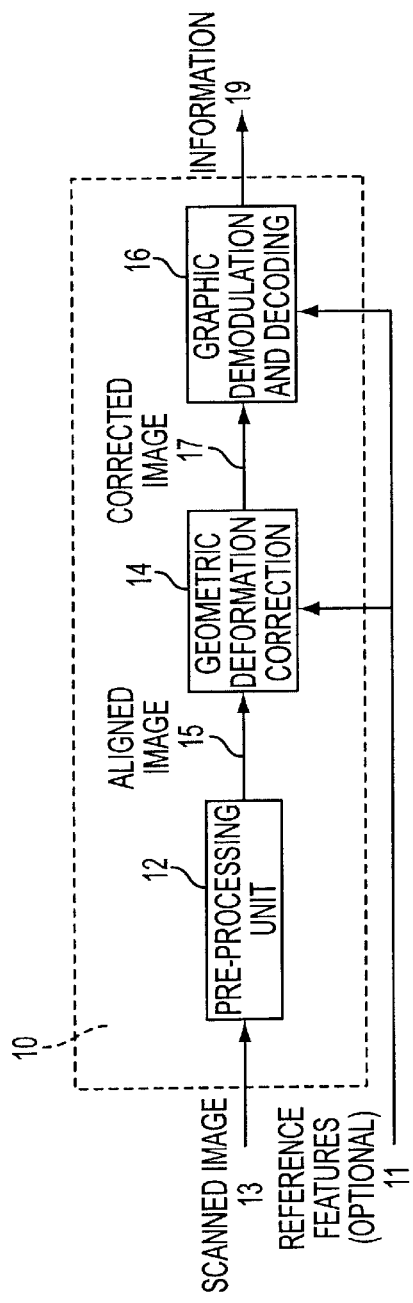
FIG. 1 illustrates a bar-code decoding system in which the geometric deformation correction unit of the present invention can be implemented.

FIG. 1 illustrates a bar code decoding system 10 configured in accordance with one embodiment of the present invention. The bar code decoding system 10 includes a pre-processing unit 12 for receiving a scanned image 13 (e.g., an image that has been distorted through successive copying) and for performing pre-processing operations and for correcting global shape deformations in the scanned image 13 through enhancement and alignment operations to generate an aligned image 15. For example, global space deformations are corrected by the pre-processing unit 12. As described previously, global shape deformations, such as translation, rotation or affine, are those that change the coordinates of the dots in a way that is consistent with an equation that describes the deformations for the entire image. Global space deformations may be corrected by determining one or more parameters (e.g., translation vector or rotation angle) that model the global deformation.

The bar code decoding system 10 also has a geometric deformation correction unit 14 that is coupled to the pre-processing unit 12 for receiving the aligned image 15 and for correcting deformations in the aligned image 15 to generate a corrected image 17. The geometric deformation correction unit 14 also optionally includes a second input for receiving one of more reference features 11 (e.g., the average gray level or dot size of the original image) that can be utilized to correct deformations in the aligned image 15.

The bar code decoding system 10 also has a graphic demodulation and decoding unit 16 that is coupled to the geometric deformation correction unit 14 for receiving the corrected image 17 and for recovering information 19 (e.g., information encoded in a two-dimensional bar code) from the corrected image 17. Demodulation and decoding operations are well known by those of ordinary skill in the art and will not be described in greater detail herein.

Figure 2:
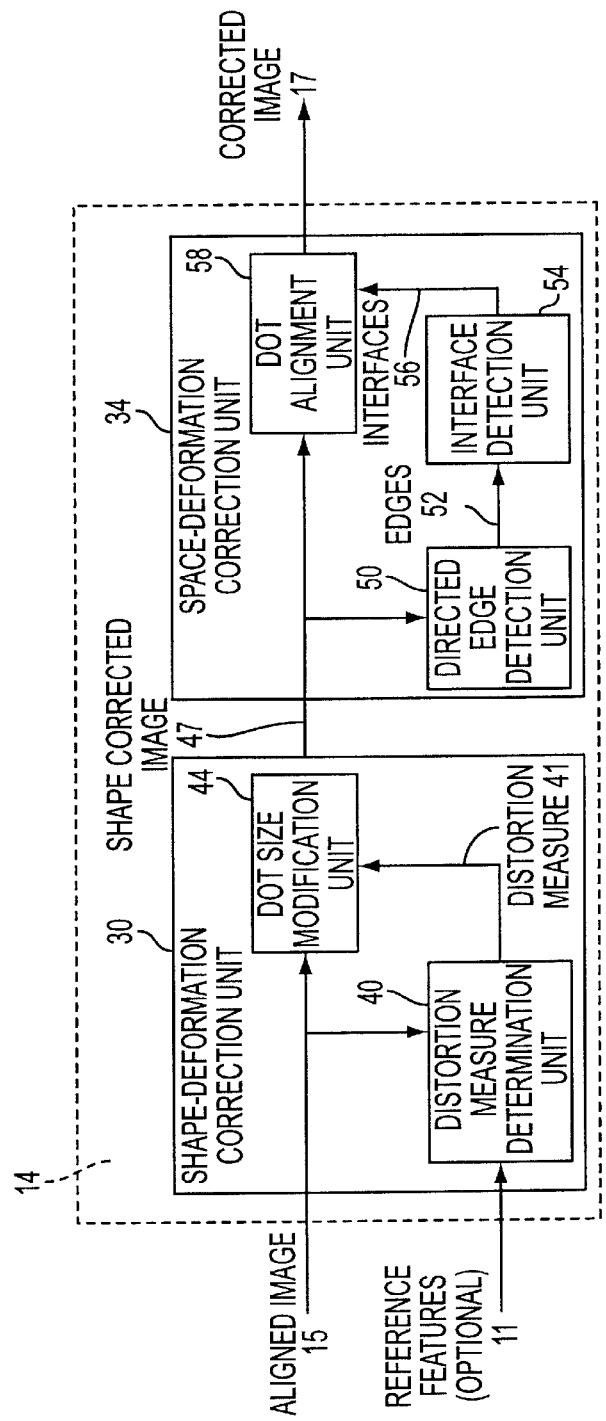
FIG. 2 illustrates in greater detail the geometric deformation correction unit of FIG. 1 configured according to one embodiment of the present invention.

FIG. 2 illustrates in greater detail the geometric deformation correction unit 14 of FIG. 1 configured according to one embodiment of the present invention. The geometric deformation correction unit 14 includes a shape-deformation correction unit 30 for correcting shape deformations in the aligned image 15, and a space-deformation correction unit 34 for correcting space deformations in the shape-corrected image 47 generated by the shape-deformation correction unit 30.

The shape-deformation correction unit 30 includes a distortion measure determination unit 40 and a dot size modification unit 44. The distortion measure determination unit 40 receives the aligned image 15 and based thereon determines the distortion measure 41 of the aligned image 15. Preferably, the distortion measure determination unit 40 also receives one or more features 11 of a reference image (e.g., one or more features of the original image) and uses those features to determine the distortion measure 41. The dot size modification unit 44 that is coupled to distortion measure determination unit 40 receives the aligned image 15 and the distortion measure 41 and performs shape deformation correction on the aligned image 15 based on the distortion measure 41 to generate a shape-corrected image 47. The terms, "dot or "dots," as used herein, refers to any objects that are used to render an image regardless of actual shape. For example, the dots can have a rectangular shape or any other geometric shape.

The present invention insures that the image rendered with dot patterns and any information encoded therein are preserved even after successive copies of the original image.

The space-deformation correction unit 34 includes a directed edge detection unit 50 for generating edges 52, an interface detection unit 54 for generating interfaces 56 based on the edges 52, and a dot alignment unit 58 for performing space-deformation correction on the shape-corrected image based on the interfaces 56 to generate a corrected image 17.

Figure 3:
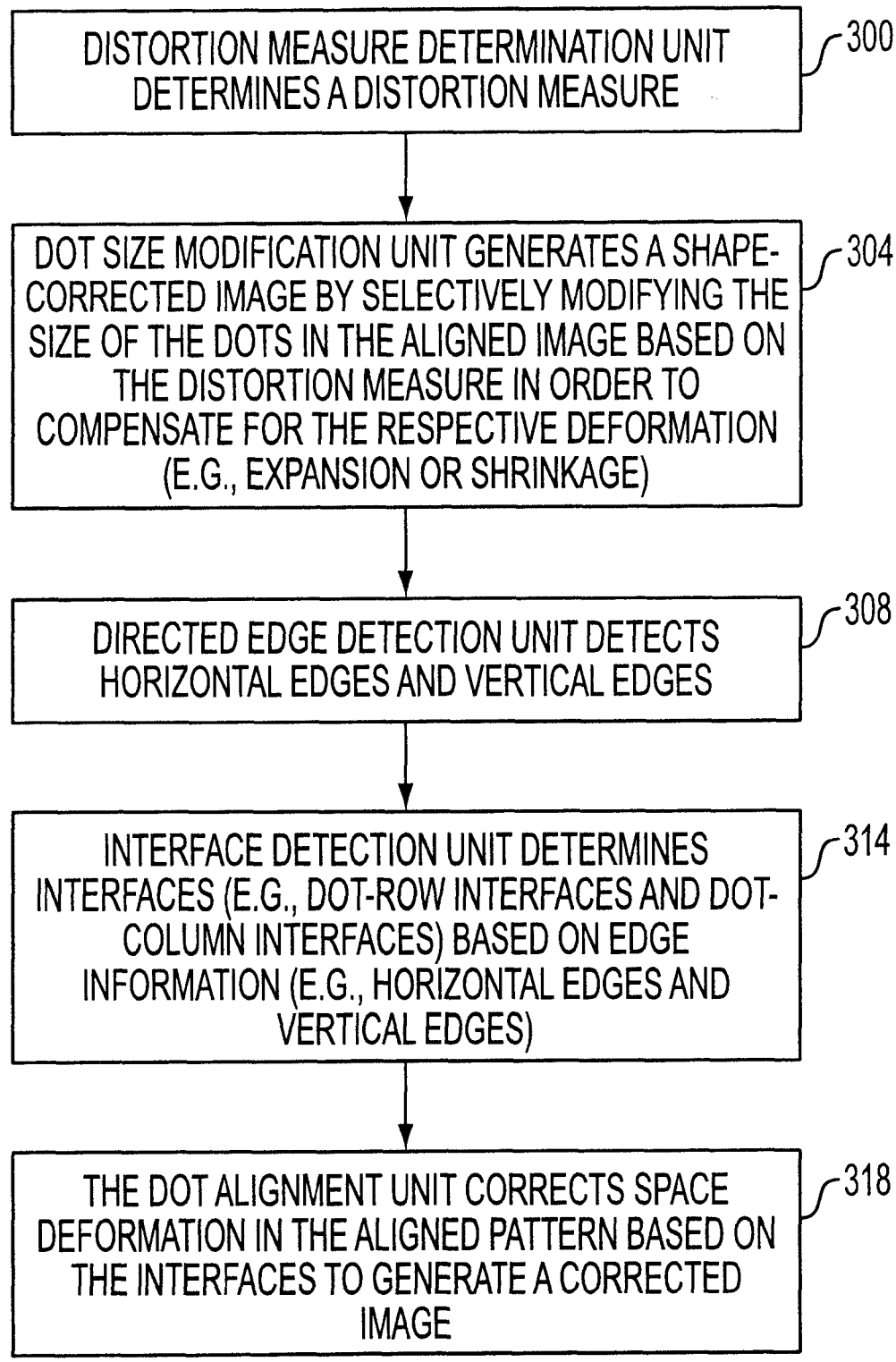
FIG. 3 is a flowchart illustrating a method for correcting geometric deformation in patterns in accordance with one embodiment of the present invention.

FIG. 3 is a flowchart illustrating the steps of a method of geometric deformation correction in accordance with one embodiment of the present invention. First, at least one morphological operation is utilized to correct for shape deformations. Preferably, the shape deformations are modeled as a morphological dilation or erosion of the black pattern, which are then corrected by the present invention by erosion or dilation, respectively. Second, row/column gradient statistics are utilized to correct for local, approximately-separable, space deformations. A separable space deformation is when all dots in a column move the same amount in the horizontal direction, and all dots in a row move the same amount in the vertical direction so that the deformation of each dot can be deduced from its position. The term "approximately separable deformation" refers to deformations with a negligible amount of movement that cannot be explained by the separable model.

In step 300, the distortion measure determination unit 40 determines a distortion measure (e.g., a shape deformation measure) that reflects the extent to which portions of the pattern (e.g., the black dots) have eroded or expanded relative to the original pattern. As will be explained hereinafter, this step can be performed with or without utilizing one or more reference features 11.

In an exemplary implementation of step 300, the following steps are performed. First, an average tone or darkness of the aligned pattern is calculated. Next, an average tone or darkness of a reference pattern (e.g., the original pattern) is calculated. The average tone of the aligned pattern is then compared with the average tone of the reference pattern, and a tone difference is generated. The tone difference is then utilized to generate a shape deformation measure, which in one example, is an erosion radius or a dilation radius.

In general, the relative area of the black pattern in a visually significant bar-code is equal to the average gray value of the original image (i.e., the image that the bar-code renders). Accordingly, the following specific steps may be performed for determining the distortion measure. First, the aligned image is binarized using a threshold function, and the relative area, b, of the black part is compared to the average gray value, g, of the original image. If the relative area, b, is smaller than the average gray value, g, the required morphological operation is dilation of the black dots. On the other hand, if the relative area, b, is larger than the average gray value, g, the required morphological operation is erosion of the black dots. The radius, r, of the required morphological correction is a function of the absolute difference $|g-b|$. In one embodiment, this function may be approximated as a linear function: $r=9|g-b|$, where b and g are represented as fractions in the range [0, 1].

In an alternative exemplary implementation of step 300, an average approach performs the following steps. First, single dots in the aligned pattern are located. Second, information, such as an average gray level or dot size, is received. Next, the radius of the single dots in the aligned pattern is then compared to the information, and a shape deformation measure is generated based on this comparison. Alternatively, the radius of a single white dot may be compared to the radius of a single black dot in the aligned image, and a shape deformation measure may be generated based on this comparison without using information from the original pattern or other reference information (e.g., average gray value or dot size).

This approach first applies a super-resolution edge-detection method, which is well known to those of ordinary skill in the art, on the deformed dot shapes. Next, horizontal and vertical black runs are measured. Runs originating in n dots are measured $n \cdot R + 2r$, where R is the dot radius, and r the deformation radius. Then, the deformation radius r is calculated by determining the radius that minimizes the best robust square fit of the measurements to the above model. For an example of this approach, please refer to Carl Staelin, and Larry McVoy, "mhz: Anatomy of a micro-benchmark", in *Proceedings of USENIX* 1998 *Annual Technical Conference*, pp. 155, New Orleans, La., June 1998.

In step 304, a dot size modification unit 44 generates a shape-correct image 47 based on aligned image 15 and the distortion measure 41. Preferably, the dot size modification unit 44 selectively modifies the size of the dots to compensate for the respective expansion or shrinkage thereof caused by the shape deformation. Step 304 may be implemented by utilizing at least one morphological operation that either erodes or dilates a dot pattern with a specified shape deformation measure (e.g., a specified radius). It is noted that the dot size modification unit 44 is not limited to a module that changes the size of dots in an image, but instead can be any unit that compensates for shape deformation of an image by using a distortion measure.

Figure 4:
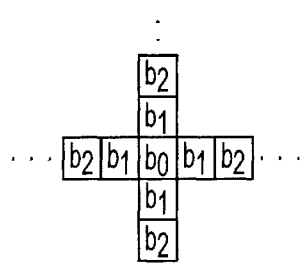
FIG. 4 is an exemplary structuring element that can be utilized for shape deformation correction in accordance with one embodiment of the present invention.

Referring to FIG. 4, the present invention preferably utilizes a structuring element having a cross shape. The element includes entries: $b_0$ in the center, $b_1$ in coordinates $(\pm 1, 0)$ and $(0, \pm 1)$, $b_2$ in coordinates $(\pm 2, 0)$ and $(0, \pm 2)$, and so on.

The shape compensation unit 44 generates a corrected image by performing a morphological gray scale dilation or erosion of the image with the above structuring element. In other words, the shape compensation unit 44 places the structuring element on every pixel in the input image. Then, the value of the dilation at the corresponding pixel is determined by calculating the minimum of the sums of neighboring pixel values with the structuring-element values placed on them. For erosion one simply takes the maximum of differences:

$$Dilate_{i,j} = \min_{k,l \in SE}\{I_{i+k,j+l} + S_{k,l}\} \text{ and } Erode_{i,j} = \max_{k,l \in SE}\{I_{i+k,j+l} - S_{k,l}\}$$

where SE is the set of valid structuring-element coordinates, and $I_{m,n}$, $S_{m,n}$ are image and structuring-element values at coordinates (m,n). ($S_{k,l}$ obtains one of $b_0, b_1, b_2, \ldots$).

The values $b_0, b_1, b_2, \ldots$ should be such that they perform as a structuring element of a given radius. For integer valued radii the following can be used:

$$\rho = i \Rightarrow b_j = \begin{cases} 0 & \text{for } j \leq i \\ 1 & \text{for } j > i \end{cases}$$

For non-integer radii, the following transformation can be used:

$$\rho \in [i-1, i] \Rightarrow b_j = \begin{cases} 0 & \text{for } j < i \\ 0.22 \cdot (i - \rho) & \text{for } j = i \\ 1 & \text{for } j < i \end{cases}$$

which was found to give a linear correction in terms of the distortion measure (e.g., deformation radius) as measured by the distortion measure determination unit 40. For example, if an image with a measured deformation radius of $r_0$, is corrected with radius $-r_1$, the subsequent deformation radius will measure $r_0 - r_1$.

Alternatively, step 304 can be implemented by modifying the predetermined threshold that defines a black pattern in the aligned image. Specifically, the threshold defining the black pattern is modified by the shape compensation unit 44. Since the black pattern is obtained from the aligned image by using a threshold, the shape compensation unit 44 can modify the threshold, thereby modifying the area of the black pattern.

In step 308, directed edge detection unit 50 detects edges (e.g., horizontal edges and vertical edges). Preferably, the horizontal edges are detected by performing a directed horizontal gradient estimation, and the vertical edges are detected by performing a directed vertical gradient estimation. For example, a forward derivative can be utilized in the horizontal or vertical direction to estimate the directed edges in the respective direction. It is noted that any directed edge detection kernel can be utilized in this step.

Alternatively, the horizontal edges are detected by determining the zero crossing of a directed horizontal Laplacian operation, and the vertical edges are detected by performing a directed vertical Laplacian operation. The Laplacian operation and the determination of zero crossing are well-known to those of ordinary skill in the image processing art and will not be described herein.

In step 314, interface detection unit 54 determines the interfaces (e.g., dot-row interfaces and dot-column interfaces) based on edge information 52 (e.g., horizontal edges and vertical edges). When the bar-code covers a relatively small area of the total area (e.g., a corner of a paper), the space deformation can be safely approximated as separable. A separable space deformation is defined as the situation in which the row and column interfaces are aligned with pixel rows and columns, and the deformation is expressed only in the uneven distribution of the interfaces.

At column interfaces there are many transients between black dots on the right of the interface and white dots on the left, or vise versa. Accordingly, in order to find the column interfaces, the interface detection unit 54 sums the absolute values of horizontal gradients in columns and locates the columns with high peaks in the gradient sum. To find the row interfaces, interface detection unit 54 simply transposes the image and performs the same operation described above. Alternatively, the interface detection unit 54 sums the absolute values of vertical gradients in rows and locates the rows with high peaks in the gradient sum.

In the preferred embodiment, the interface detection unit 54 also provides for outlier interfaces. First, the interface detection unit 54 determines a range (e.g. a range measured from the last interface) in which to look for the new interface. If no interface is detected in that range, the interface detection unit 54 determines the interface to be a standard dot-size away from the last interface. In this manner, outlier interfaces are detected. Outlier interfaces are those which for some reason, have a weak gradient activity (e.g. a situation where in most rows, dots on both sides of the interface have identical values).

Alternatively, the interface detection unit 54 performs the following procedure that is especially useful in applications where the space deformation is distinctly not separable. First, the interface detection unit 54 estimates column interfaces row-by-row. In every row the location of each column interface is determined so as to satisfy one or more consistency requirements.

These consistency requirements can include, but are not limited to: (1) the interface should preferably agree with local large gradient magnitudes; (2) the interface should not deviate much from its location in the previous row; and (3) the interface should form a quasi-uniform pattern with near by interface locations in the same row.

The following is an exemplary implementation of the above-described alternative embodiment for the interface detection unit 54. First, interfaces are recorded in sub-pixel accuracy. Next, binary gradients are determined by thresholding the aligned image. If a gradient is located within a predetermined pixel distance (e.g., 1.5 pixel from an interface location in the previous row, the gradient is associated with that interface. Interfaces with no gradient association keep their location from the previous row. Interfaces with multiple gradient associations relate only to the closest gradient, and determine their new location as a weighted average between its location (e.g., weight of 0.3) and their location in the previous line (e.g., weight of 0.7). When all the interfaces for a row have been determined this way, their final location is a weighted-average between these locations and the average location of their respective neighbors on the left and right. It is noted that the average extent may range up to several interfaces on each side.

In step 318, the dot alignment unit 58 corrects space deformation in the shape-corrected image 47 based on the interfaces 56. In the preferred implementation, the dot alignment unit 58 virtually aligns the dots by augmenting the aligned image with a list of dot centers. The list describes a potentially non-uniform square grid of dot centers. The dot alignment unit 58 computes dot center coordinates as the center of the interface coordinates on both sides.

Alternatively, the dot alignment unit 58 can compose a new image from sub-images cropped around located dot centers. In this manner, dot centers in the shape-corrected image 47 are located on a uniform square grid, and each dot covers a square patch of pixels around it. This square patch is cropped out of the respective dot location in the shape-corrected image 47. In this approach, there are pixels in the shape-corrected image 47 that will not be found in the corrected image 17, and other pixels that are copied to several locations in the corrected image 17.

Figure 5:
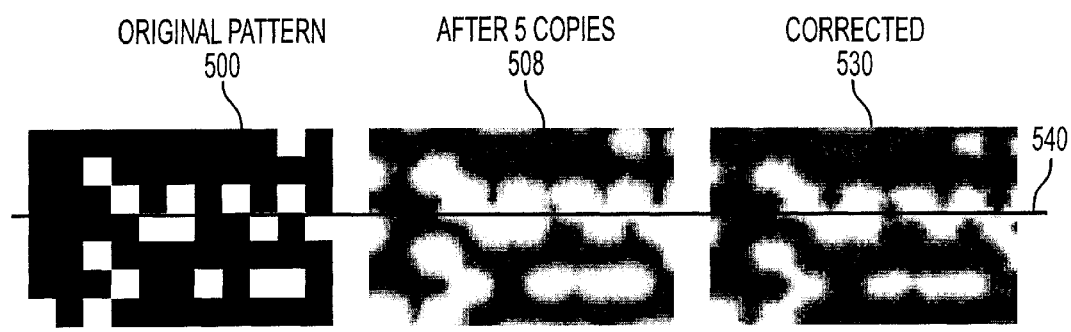
FIG. 5 illustrates how the present invention corrects shape deformation in an exemplary dot pattern image.

FIG. 5 illustrates how the present invention corrects shape deformation in an exemplary dot pattern image 500. The original dot pattern image 500 has a plurality of black and white pixels (e.g., black and white squares) that are arranged in rows and columns. After successive copies, the pixels dilate and cross row and column interfaces. For example, a copied image 508 shows how the original pattern is deformed after five copies. It is readily apparent that the white pixels, for example, have dilated to cross row interface 540 after successive copies. The present invention utilizes the shape deformation correction unit 30 to receive the copied image 508 and correct shape deformations to generate a shape corrected image 530. It is noted that corrected image 530 features row interfaces and column interfaces that are better aligned than those of the copied image 508. Also, single dots are easier to determine in the corrected image 530 than in the copied image 508.

Figure 6:
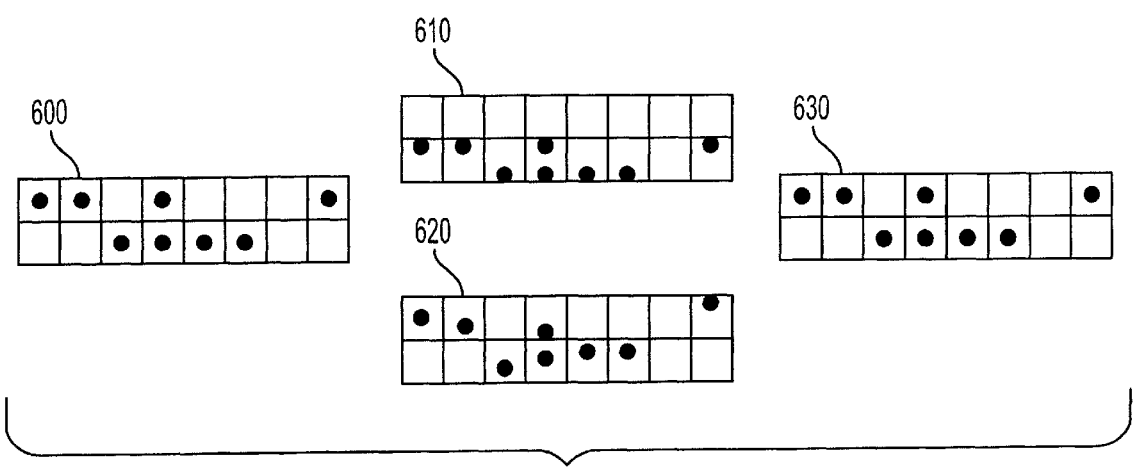
FIG. 6 illustrates how the present invention corrects space deformation in an exemplary dot pattern image.

FIG. 6 illustrates how the present invention corrects space deformation in an exemplary dot pattern image 600. The dot pattern image 600 has sixteen pixels arranged in rows and columns. In this example, there are two rows with each row having eight pixels. A first copy 610 shows how dots have undergone a separable deformation (e.g., when all the dots in the first row have been moved an equal amount in the negative y direction). Similarly, all the dots in the second row have also undergone a separable deformation in that they have been moved in an equal amount in the negative y direction. A second copy 620 shows dots that have undergone a non-separable deformation (e.g., when the movement of dots in the first row is independent and different for each dot in the first row). Similarly, all the dots in the second row have also undergone a non-separable deformation in that the movement of dots in the second row is independent and different for each dot in the second row. In either case, the present invention corrects for the space deformation by either measuring the coordinate deformation for the each row when the deformation is separable as in the case with the first copy 610 or by measuring the coordinate deformation for each dot in each row when the deformation is non-separable as in the case with the second copy 620. The present invention receives either the first copy 610 or the second copy 620 and corrects the space deformations to generate a corrected image 630.

The foregoing description has provided numerous examples of the present invention. It will be appreciated that various modifications and changes may be made thereto without departing from the broader scope of the invention as set forth in the appended claims.

What is claimed is:

1. A method for correcting geometric deformations comprising:

(a) receiving a aligned image having a plurality of dots that have undergone geometric deformation;

(b) correcting the shape deformations of the dots in the aligned image by utilizing at least one morphological operation to generate a shape-corrected image; and (c) correcting the space deformation in the shape-corrected image by utilizing row/column gradient statistics to generate a corrected image.

2. The method of claim 1 further comprising:

determining an average tone of the aligned image; and generating a distortion measure based on the average tone of the aligned image.

3. The method of claim 2 wherein generating a distortion measure based on the average tone of the aligned image comprises:

generating one of a dilation radius and an erosion radius based on the average tone.

4. The method of claim 1 further comprising:

determining a dimension of a first dot in the aligned image;

determining a dimension of a second dot in the aligned image; and generating a distortion measure based on the dimension of the first dot and the dimension of the second dot.

5. The method of claim 4 wherein determining a dimension of the first dot in the aligned image includes determining a radius of the first dot; wherein determining a dimension of the second dot in the aligned image includes determining a radius of the second dot; and wherein generating a distortion measure based on the dimension of the first dot and the dimension of the second dot includes generating one of a dilation radius and an erosion radius based on the dimension of the first dot and the dimension of the second dot.

6. The method of claim 1 wherein correcting the shape deformations of the dots by utilizing at least one morphological operation includes:

determining a distortion measure based on the aligned image; and modifying at least one dimension of the dots based on the distortion measure.

7. The method of claim 1 wherein correcting the shape deformations of the dots by utilizing at least one morphological operation includes:

determining a distortion measure based on the aligned image; and modifying a threshold for defining a black pattern in the aligned image.

8. The method of claim 1 wherein correcting the space deformation by utilizing row/column gradient statistics includes:

determining dot interfaces based on the aligned image; and adding dot center information to the aligned image based on the dot interfaces.

9. The method of claim 8 wherein determining dot interfaces based on the reference image and the aligned image includes:

detecting horizontal edges;

locating dot-column interfaces based on the horizontal edges;

detecting vertical edges; and locating dot-row interfaces based on the vertical edges.

10. The method of claim 9 wherein detecting horizontal edges includes detecting horizontal edges by utilizing a directed horizontal gradient estimation, and wherein detecting vertical edges includes detecting vertical edges by utilizing a directed vertical gradient estimation.

11. The method of claim 9 wherein detecting horizontal edges includes detecting horizontal edges by determining the zero crossing of a directed horizontal Laplacian operation, and wherein detecting vertical edges includes detecting vertical edges by determining the zero crossing of a directed vertical Laplacian operation.

12. The method of claim 1 wherein correcting the space deformation by utilizing row/column gradient statistics includes:

determining dot interfaces based on the aligned image;

determining dot centers based on the dot interfaces;

generating a new image having a plurality of sub-images cropped around the dot centers.

13. The method of claim 1 further comprising:

correcting separable space deformations; wherein the step of correcting separable space deformations includes locating dot-column interfaces by summing the absolute value of the horizontal gradient in columns; wherein a large sum indicates a dot-column interface; and locating dot-row interfaces summing the absolute value of the vertical gradient in the rows; wherein a large sum indicates a dot-row interface.

14. The method of claim 1 further comprising:

correcting non-separable space deformations; wherein the step of correcting non-separable space deformations includes estimating column interfaces row-by-row and requiring consistency with gradient magnitudes, near by interface locations, and interface locations in a previous row.

15. The method of claim 1 further comprising:

correcting non-separable space deformations; wherein the step of correcting non-separable space deformations includes estimating row interfaces column-by-column and requiring consistency with gradient magnitudes, near by interface locations, and interface locations in a previous column.

16. The method of claim 1 further comprising:

receiving a reference image;

determining an average tone of the reference image;

determining an average tone of the aligned image;

comparing the average tone of the reference image and the average tone of the aligned image to generate a difference in tone; and generating a distortion measure based on the difference in tone.

17. The method of claim 1 further comprising:

receiving a reference image;

determining a dimension of a dot in the reference image;

determining a dimension of a corresponding dot in the aligned image;

comparing the dimension of a dot in the reference image and the dimension of a corresponding dot in the aligned image to generate a difference in dimension; and generating a distortion measure based on the difference in dimension.

18. A geometric deformation correction system comprising:

a shape deformation correction unit for receiving a aligned image and based thereon for generating a shape-corrected image; and a space deformation correction unit, coupled to the shape deformation correction unit, for receiving the shape-corrected image, generating edges and interfaces, and generating an aligned image based on the interfaces and the shape-corrected image.

19. The correction system of claim 18 wherein the shape deformation correction unit further comprises:

a distortion measure determination unit for receiving a reference image and generating a distortion measure that represents the relative distortion between dots in a reference image and the aligned image; and a dot size modification unit coupled to the shape distortion determination unit for modifying the aligned image to generate a shape-corrected image based on the distortion measure.

20. The correction system of claim 19 wherein the distortion measure includes a deformation radius representing the difference between the radius of a dot in the reference image and the radius of a corresponding dot in the aligned image.

21. The correction system of claim 18 wherein the space deformation correction unit further comprises:

a directed edge detection unit for receiving the shape-corrected image and generating edges based thereon; and a interface detection unit coupled to the directed edge detection unit for receiving the edges and based thereon for generating interfaces; and a dot alignment unit coupled to the interface detection unit for generating a corrected image based on the interfaces and the shape-corrected image.

* * * * *